United States Patent
Ley

(10) Patent No.: US 9,885,391 B2
(45) Date of Patent: Feb. 6, 2018

(54) SELF-ADJUSTING MECHANISM FOR A FRICTION CLUTCH

(71) Applicant: Ace Manufacturing and Parts Co., Sullivan, MO (US)

(72) Inventor: Brian R. Ley, Washington, MO (US)

(73) Assignee: ACE Manufacturing and Parts Co., Sullivan, MO (US)

( * ) Notice: Subject to any disclaimer, the term of this patent is extended or adjusted under 35 U.S.C. 154(b) by 344 days.

(21) Appl. No.: 14/836,590

(22) Filed: Aug. 26, 2015

(65) Prior Publication Data

US 2017/0058967 A1   Mar. 2, 2017

(51) Int. Cl.
*F16D 13/75*   (2006.01)
*F16D 13/22*   (2006.01)

(52) U.S. Cl.
CPC ............ *F16D 13/757* (2013.01); *F16D 13/22* (2013.01); *F16D 13/75* (2013.01)

(58) Field of Classification Search
None
See application file for complete search history.

(56) References Cited

U.S. PATENT DOCUMENTS

| | | |
|---|---|---|
| 3,752,286 A | 8/1973 | Sink |
| 4,099,604 A * | 7/1978 | Higgerson ............ F16D 13/757 |
| | | 192/111.17 |
| 4,228,883 A | 10/1980 | Palmer |
| 5,029,687 A | 7/1991 | Asada et al. |
| 5,090,536 A | 2/1992 | Asada |
| 5,251,737 A | 10/1993 | Flotow et al. |
| 5,971,125 A * | 10/1999 | Doremus ............ F16D 13/583 |
| | | 192/111.17 |
| 6,062,365 A | 5/2000 | Gochenour |
| 6,161,670 A * | 12/2000 | Doremus ............ F16D 13/757 |
| | | 192/111.17 |
| 8,733,525 B2 | 5/2014 | Raber et al. |
| 2007/0012529 A1 | 1/2007 | Kreidler et al. |

* cited by examiner

*Primary Examiner* — Colby M Hansen
(74) *Attorney, Agent, or Firm* — David E. Crawford; Crawford IP Law

(57) ABSTRACT

A self-adjusting mechanism for a clutch having a cover, a pressure plate, a clutch release mechanism, and an adjustment ring. The self-adjusting mechanism includes a shaft mounted on the cover having a flange extending around the shaft. The self-adjusting mechanism includes a first hub member connected to the clutch release mechanism. The self-adjusting mechanism includes a second hub member connected to the adjustment ring so rotating the second hub member through angles in a first direction greater than a predetermined angle moves the adjustment ring to adjust the position of the clutch release mechanism. The adjustment ring remains stationary as the second hub member rotates through angles less than the predetermined angle. The self-adjusting mechanism has a spring biasing the first and second hub members together and a spring housing. An opening in the spring housing is blocked by the flange to prevent contaminates from entering the housing.

26 Claims, 12 Drawing Sheets

(Clutch Engaged)

(Clutch Disengaged)

SELF-ADJUSTING MECHANISM FOR A FRICTION CLUTCH

BACKGROUND

The present invention generally relates to friction clutches, and more particularly to a self-adjusting mechanism which automatically compensates for the wear of friction components of the clutch.

Self-adjusting devices that automatically compensate for the wear of friction surfaces of spring-loaded clutches are known in the art. Exemplary devices are disclosed in U.S. Pat. Nos. 3,752,286 and 5,251,737. A more recent device exemplary device is disclosed in U.S. patent application Ser. No. 14/033,828.

SUMMARY

In one aspect, a self-adjusting mechanism is disclosed. The mechanism is for a friction clutch having a cover, and a pressure plate movable relative to the cover to selectively engage opposing friction members with one another. The friction clutch also includes a clutch release mechanism movable relative to the cover to disengage the opposing friction members, and an adjustment ring selectively moveable with respect to the cover to adjust a position of the clutch release mechanism relative to the cover to compensate for wear between the opposing friction members. The self-adjusting mechanism comprises a unitary shaft mounted on the cover. The shaft has a central longitudinal axis and a flange extending radially outward from and circumferentially around the shaft. Further, the self-adjusting mechanism includes a first hub member rotatably mounted on the shaft and operatively connected to the clutch release mechanism such that moving the clutch release mechanism in a first direction rotates the first hub member about the longitudinal axis of the shaft in a first rotational direction and moving the clutch release mechanism in a second direction opposite the first direction rotates the first hub member about the longitudinal axis of the shaft in a second rotational direction opposite the first rotational direction. The self-adjusting mechanism also includes a second hub member rotatably mounted on the shaft coaxially with the first hub member and operatively connected to the adjustment ring such that rotating the second hub member about the longitudinal axis of the shaft through angles in a first rotational direction greater than a predetermined angle moves the adjustment ring with respect to the cover to adjust relative positions of the clutch release mechanism and the cover to compensate for wear between the friction members. The adjustment ring remains stationary as the second hub member rotates about the longitudinal axis of the shaft through angles less than the predetermined angle in the first rotational direction and through angles less than the predetermined angle in the second rotational direction opposite the first rotational direction. In addition, the self-adjusting mechanism has a spring biasing one of the first hub member and the second hub member toward the other. Still further, the self-adjusting mechanism includes a spring housing having an interior formed in the one of the first hub member and the second hub member and an opening providing access to the interior. The housing is sized and shaped for receiving the spring. The opening of the spring housing is blocked by the flange of the shaft to prevent contaminates from entering the housing. Thus, the flange blocking the housing opening protects the spring from contaminates.

In another aspect, a self-adjusting mechanism is disclosed. The mechanism is for a friction clutch having a cover, and a pressure plate movable relative to the cover to selectively engage opposing friction members with one another. The clutch also includes a clutch release mechanism movable relative to the cover to disengage the pair of friction members, and an adjustment ring selectively moveable with respect to the cover to adjust relative positions of the clutch release mechanism and the cover to compensate for wear between the friction members. The self-adjusting mechanism comprises a shaft mounted on the cover. The shaft having a central longitudinal axis and a flange. In addition, the self-adjusting mechanism includes a hub member rotatably mounted on the shaft and operatively connected to the clutch release mechanism such that moving the clutch release mechanism in a first direction tends to rotate the hub member about the longitudinal axis of the shaft in a first rotational direction and moving the clutch release mechanism in a second direction opposite the first direction tends to rotate the hub member about the longitudinal axis of the shaft in a second rotational direction opposite the first rotational direction. Further, the self-adjusting mechanism has a drive rotatably mounted on the shaft coaxially with the hub member and operatively connected to the adjustment ring so the adjustment ring moves with respect to the cover as the drive rotates about the longitudinal axis of the shaft. Moreover, the self-adjusting mechanism comprises a lost motion mechanism operatively connected between the hub member and drive, allowing the hub member and the drive to rotate freely with respect to one another over a limited angular range. The self-adjusting mechanism also includes a mechanism housing formed in at least one of the hub member and the drive. The housing is sized for receiving the lost motion mechanism to protect the mechanism from contaminates.

In still another aspect, a self-adjusting mechanism is disclosed. The mechanism is for a friction clutch having a cover, and a pressure plate movable relative to the cover to selectively engage opposing friction members with one another. The clutch also includes a clutch release mechanism movable relative to the cover to disengage the pair of friction members, and an adjustment ring selectively moveable with respect to the cover to adjust relative positions of the clutch release mechanism and the cover to compensate for wear between the friction members. The self-adjusting mechanism comprises a first mount mounted on the cover and having an opening extending through a thickness. The mechanism also comprises a second mount mounted on the cover opposing the first mount. The second mount is identical to the first mount and spaced from the first mount by a predetermined distance. Further, the self-adjusting mechanism includes a shaft mounted between the first and second mounts. The shaft has a central longitudinal axis extending between opposite ends and a pair of opposite facing shoulders spaced from one another by the predetermined distance, one of the shoulders abutting the first mount so the shaft extends into the opening thereof, and the other of the shoulders abutting the second mount so the shaft extends into the opening thereof. In addition, the self-adjusting mechanism has a first hub member rotatably mounted on the shaft between the first and second mounts and operatively connected to the clutch release mechanism such that moving the clutch release mechanism in a first direction rotates the first hub member about the longitudinal axis of the shaft in a first rotational direction and moving the clutch release mechanism in a second direction opposite the first direction rotates the first hub member about the longitudinal axis of the shaft in a second rotational direction opposite the first rotational direction. The self-adjusting mechanism also includes a second hub member rotatably mounted on the shaft between the first and second mounts coaxially with the first hub member and operatively connected to the adjustment ring such that rotating the second hub member about the longitudinal axis of the shaft through angles in a first rotational direction greater than a predetermined angle moves the adjustment ring with respect to the cover to adjust relative positions of the clutch release mechanism and the cover to compensate for wear between the friction members. The adjustment ring remains stationary as the second hub member rotates about the longitudinal axis of the shaft through angles less than the predetermined angle in the first rotational direction and through angles less than the predetermined angle in the second rotational direction opposite the first rotational direction. Lastly, the self-adjusting mechanism comprises a spring biasing one of the first hub member and the second hub member toward the other. The spring is positioned between the one of the first hub member and the second hub member and a corresponding one of the first mount and the second mount.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
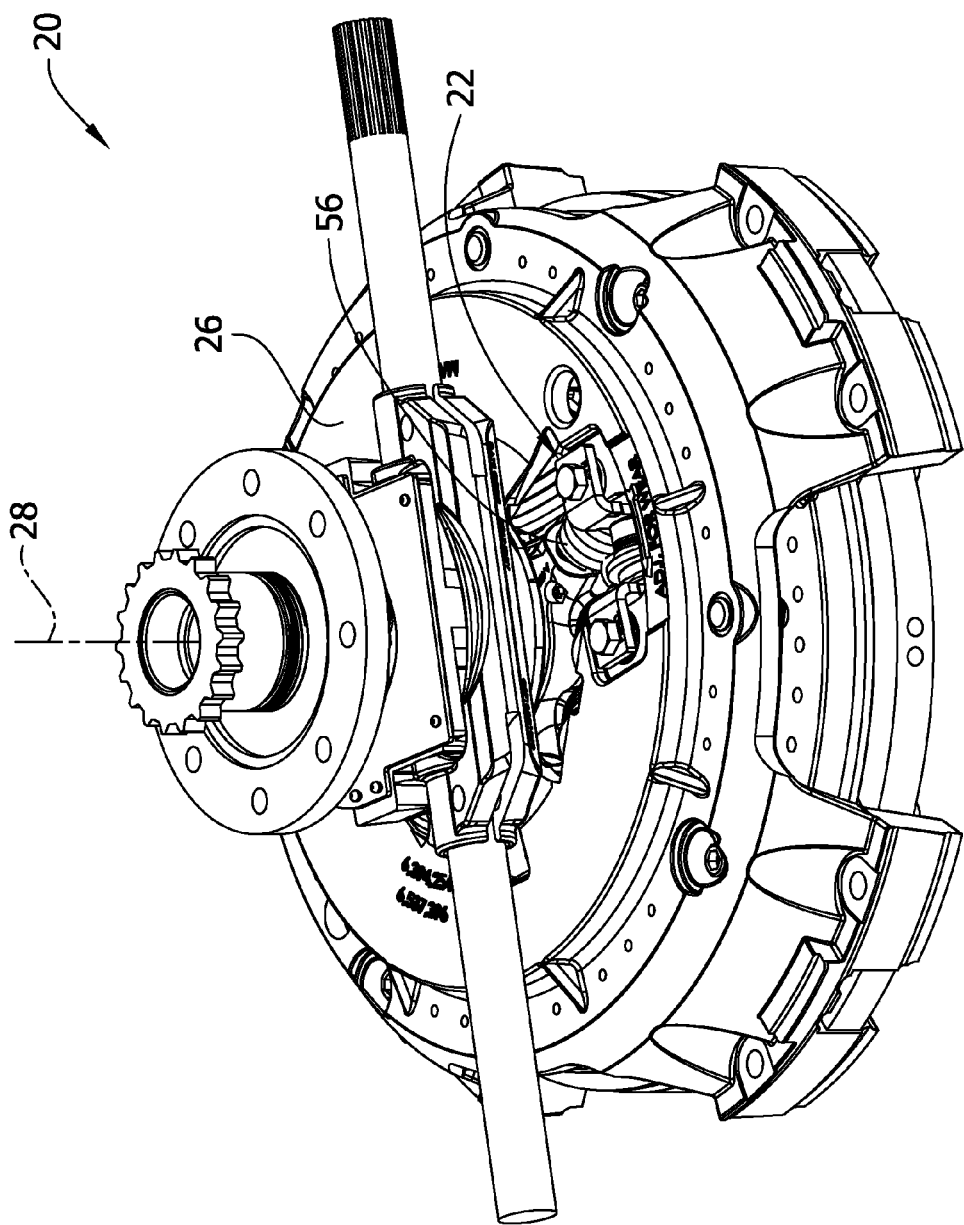
FIG. 1 is a perspective of a friction clutch incorporating a self-adjusting mechanism.
Figure 2:
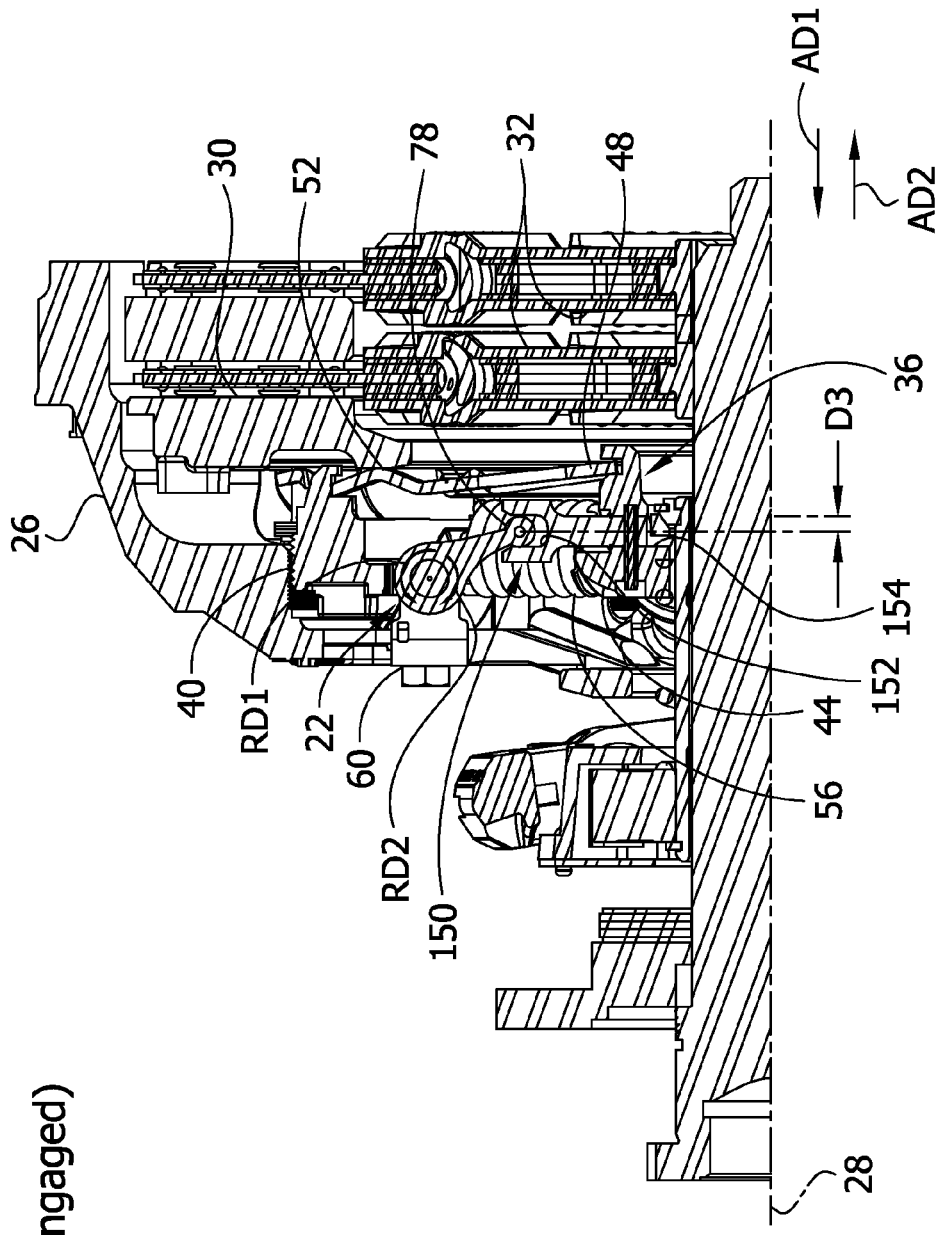
FIG. 2 is a cross-sectional view of the clutch of FIG. 1 showing the clutch in an engaged position.
Figure 3:
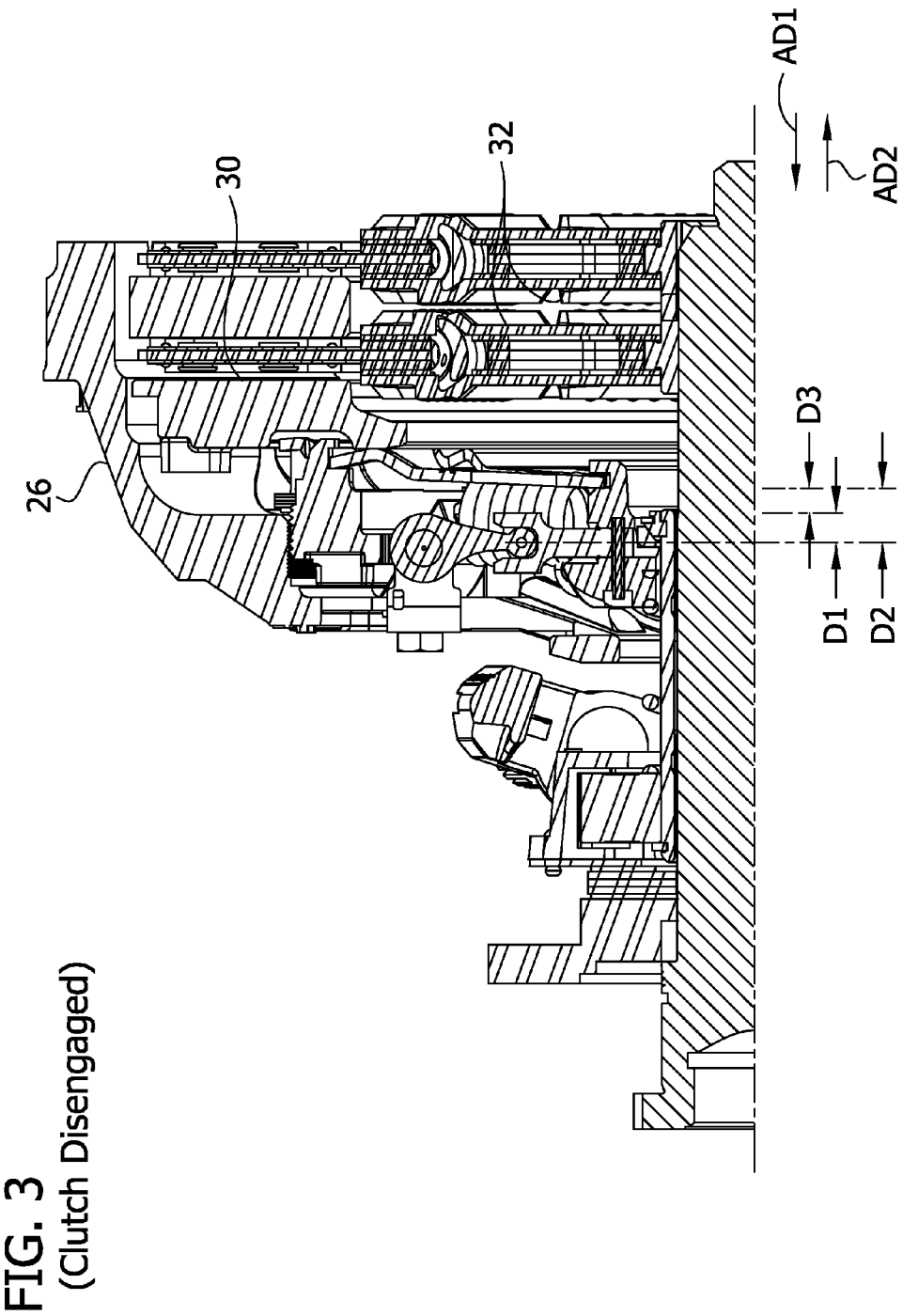
FIG. 3 is a cross-sectional view of the clutch of FIG. 1 showing the clutch in a disengaged position.

Referring to the drawings, FIGS. 1-3 illustrate a friction clutch, generally designated 20, incorporating a self-adjusting mechanism of the present invention, generally designated 22. In general, the clutch 20 comprises a cover 26 having a central axis 28, a pressure plate 30 movable along the axis relative to the cover to cause friction members 32 of the clutch to move into engagement, a clutch release mechanism, generally designated by 36, movable along the axis toward and away from the pressure plate, and an adjustment ring 40 having a threaded connection with the cover. The adjustment ring 40 is selectively rotatable so it moves with respect to the cover 26 to adjust a position of the clutch release mechanism 36 relative to the cover to compensate for wear of the friction members 32. The clutch release mechanism 36 comprises a release sleeve 44 that moves along the axis 28 of the clutch in response to the adjustment ring 40 being rotated. The release sleeve 44 moves release levers 48 that engage the pressure plate 30 at fulcrum locations 52. To disengage the clutch, the release mechanism 36 moves along axis 28 in a first axial direction AD1 (toward the left as viewed in FIGS. 2 and 3) against the urging of one or more coil springs 56. To engage the clutch, the release mechanism 36 moves along axis 28 under the urging of the coil springs 56 in a second axial direction AD2 toward the pressure plate 30 (toward the right as viewed in FIGS. 2 and 3).

Referring to FIGS. 4-9, the self-adjusting mechanism 22 comprises, in general, a pair of identical opposing mounting brackets or mounts, generally designated by 60, adapted to be secured to the cover 26. A pin or shaft, generally designated by 62, extending between the brackets 60 supports first and second rotatable hub members 72, 74 for rotation about an axis of rotation 76. Engageable ratchet teeth 72T, 74T on the first and second hub members 72, 74, respectively, are configured (e.g., skewed) so the first hub member is rotatable relative to the second hub member in a first rotational direction RD1 but engages and drives the second hub member in a second rotational direction RD2 opposite the first rotational direction when the first hub member rotates in the second rotational direction. In other words, the ratchet teeth 72T, 74T cause the second hub member 74 to rotate in unison with the first hub member 72 unless the second member is held stationary against rotation. An arm 78 extends from the first hub member 72 to provide leverage to rotate the first hub member about the axis 76 in the first and second rotational directions RD1, RD2. Further, the self-adjusting mechanism 22 includes a worm gear, generally designated by 80, supported on the shaft 62 for rotation, and an anti-slip device, generally designated by 82, configured to hold the worm gear against rotation in the first rotational direction RD1 but to allow rotation of the worm gear in the second rotational direction RD2.

The self-adjusting mechanism 22 also comprises a lost-motion connection 88 between the worm gear 80 and the release mechanism 36 permitting a limited range of free play between the worm gear and the release mechanism as the release mechanism moves in the first axial direction AD1 toward the pressure plate and the second axial direction AD2 away from the pressure plate. In the illustrated mechanism 22, the lost motion connection 88 is located between the second hub member 74 and the worm gear 80 and permits a limited range of free rotational movement of the second hub member relative to the worm gear. The lost motion connection 88 may be functionally positioned at other locations between the worm gear 80 and release mechanism 36, such as between the first and second hub members 72, 74 or between the adjustment arm 78 and the release mechanism, as will be described later. The various components of the self-adjusting mechanism 22 are described in more detail below.

Figure 4:
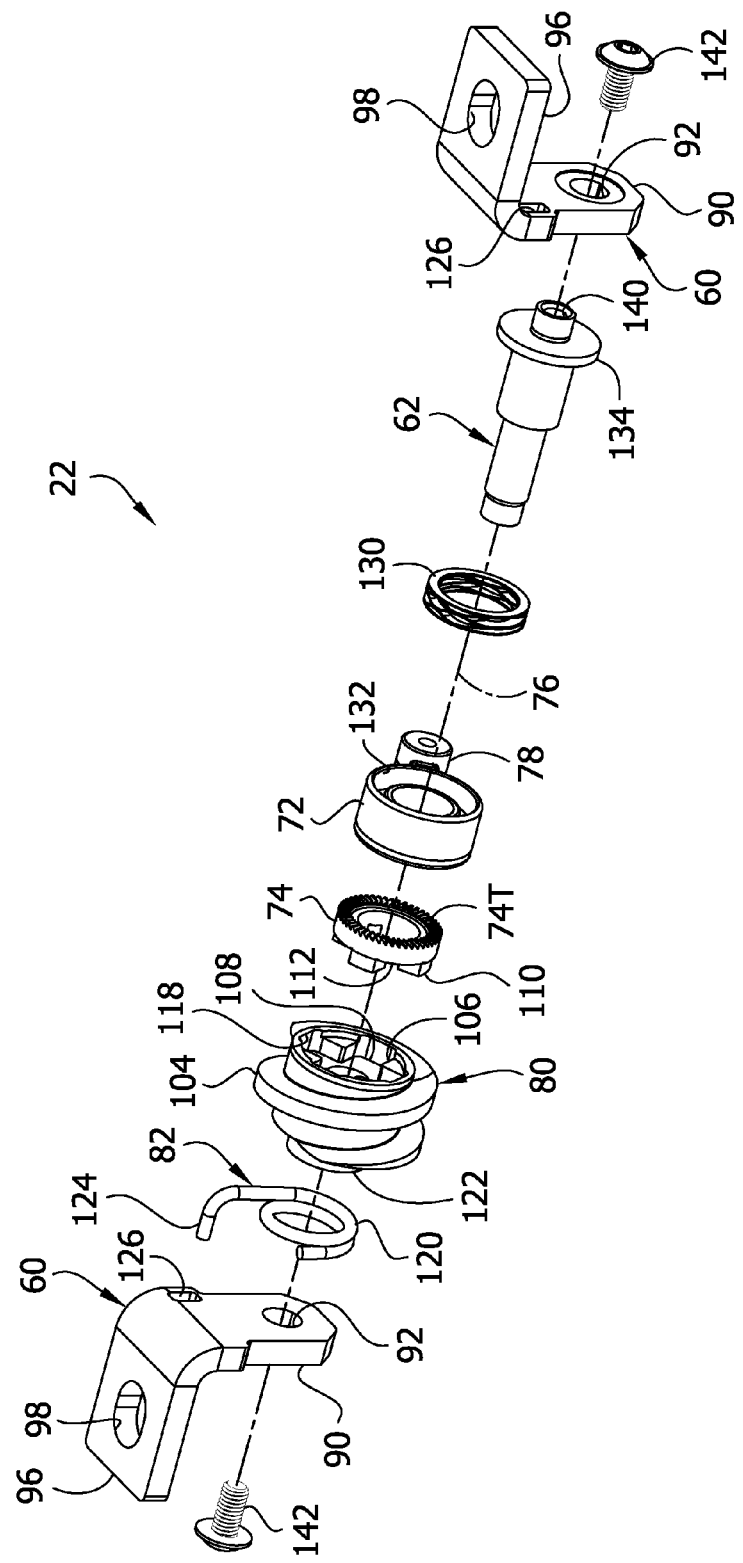
FIG. 4 is a separated perspective of the self-adjusting mechanism
Figure 5:
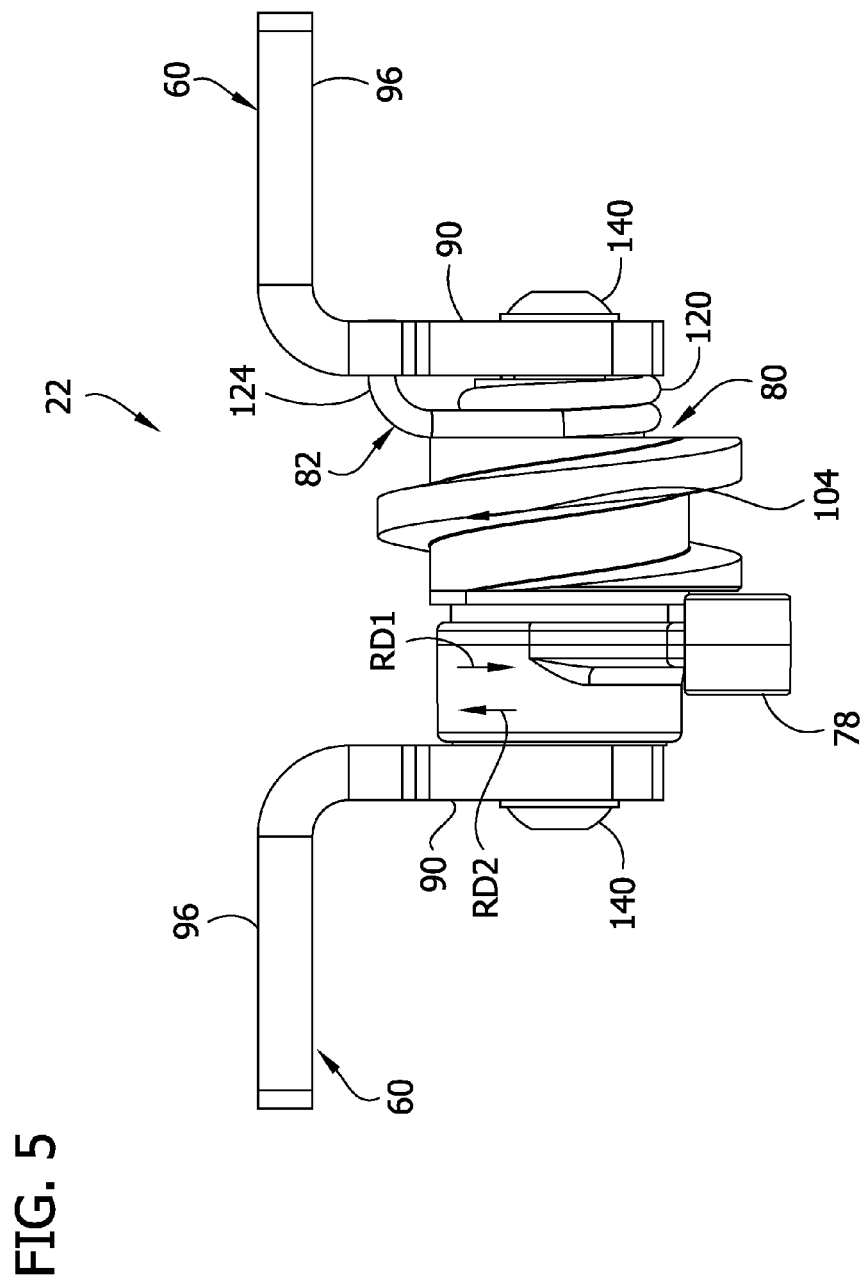
FIG. 5 is a front elevation of the self-adjusting mechanism.
Figure 6:
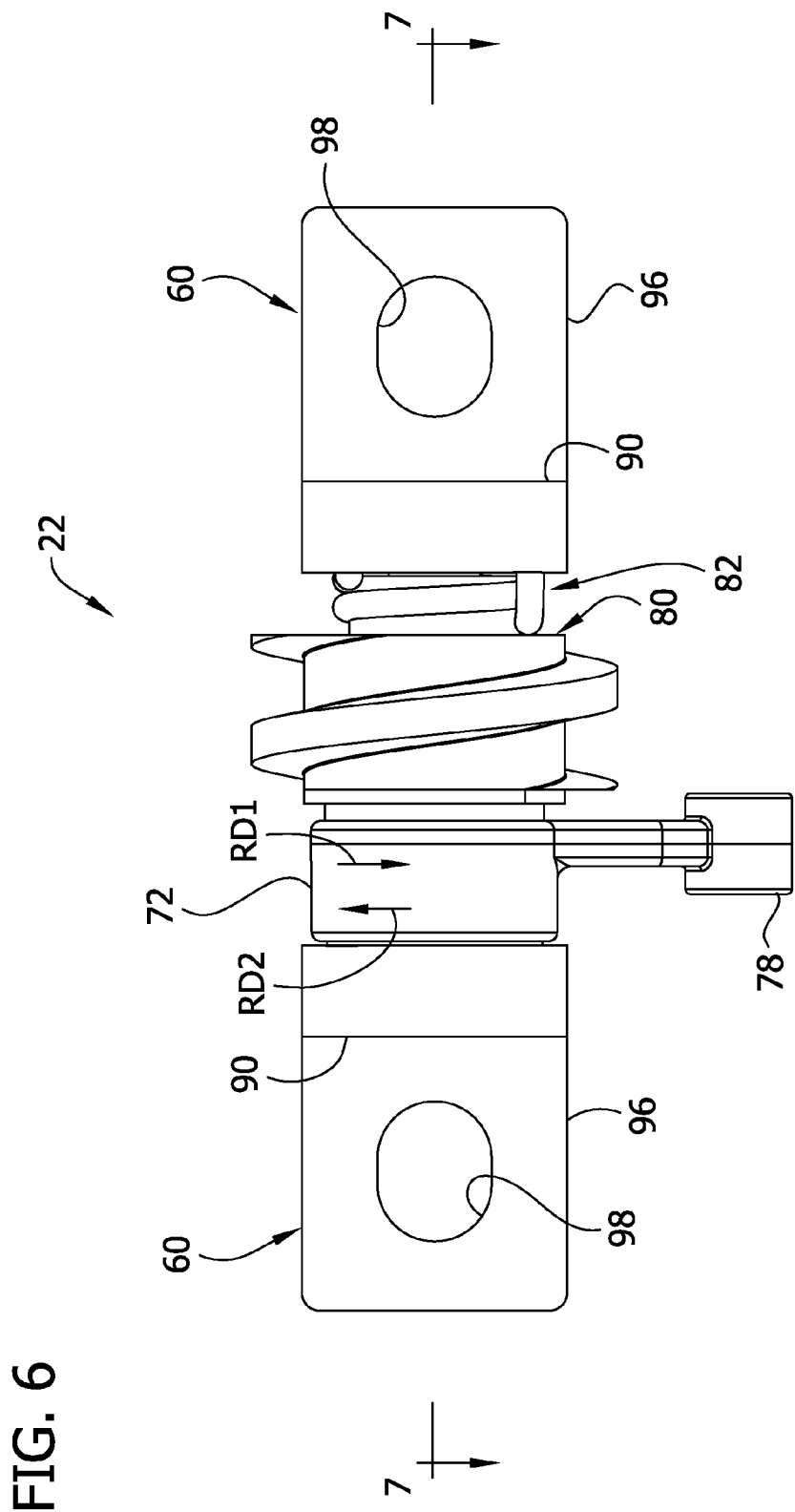
FIG. 6 is a top plan of the self-adjusting mechanism.

Referring to FIG. 4, each of the mounting brackets 60 is generally L-shaped, comprising a leg 90 having an opening 92 and a flange 94 having a elongate fastener hole 96 extending laterally from an end of the leg. The fastener hole 96 of the flange 94 receives a fastener for fastening the bracket 60 to the cover 26 of the clutch. Each fastener hole 96 is elongate to compensate for assembly position tolerances. Each mounting bracket 60 is identical, reducing inventor cost and opportunity for misassembly. The opening 92 in each leg 90 of the bracket 60 receives a corresponding end of the shaft 62 so the first and second hub members 72, 74 rotate about the axis 76. The first hub member 72 is a generally cylindrical member having an internal annular surface formed with the ratchet teeth 72T. Desirably, the adjustment arm 78 and first hub member 72 have a non-slip connection such that rotating the adjustment arm causes the first hub member to rotate without substantial rotational slippage (and preferably no rotational slippage) between the two parts 72, 78 even when there is substantial resistance to rotation of the first hub member. The adjustment arm 78 and first hub member 72 are integrally formed as a unitary part in some mechanisms 22 so the adjustment arm extends generally radially from the first hub member. Alternatively, the adjustment arm 78 and first hub member 72 may be formed as two parts rigidly secured together to prevent slippage between the parts.

Figure 7:
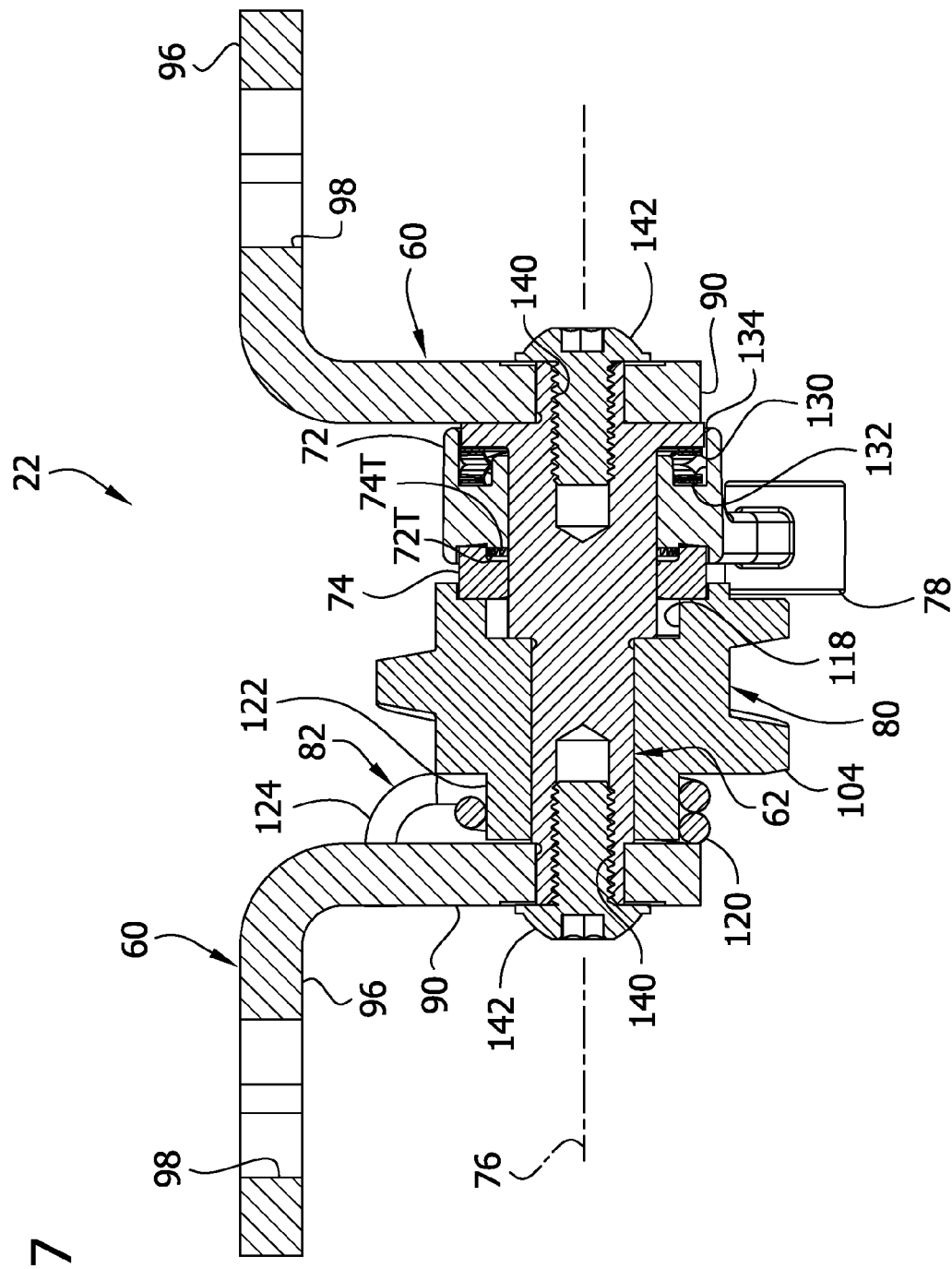
FIG. 7 is a section taken in the plane of 6-6 of FIG. 5.
Figure 8:
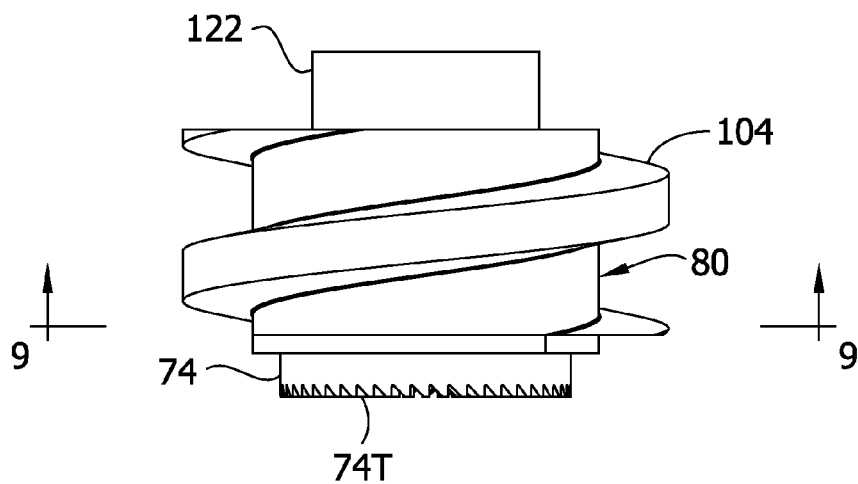
FIG. 8 is a top plan of a lost-motion connection between lugs on a second hub member and a worm gear.
Figure 9:
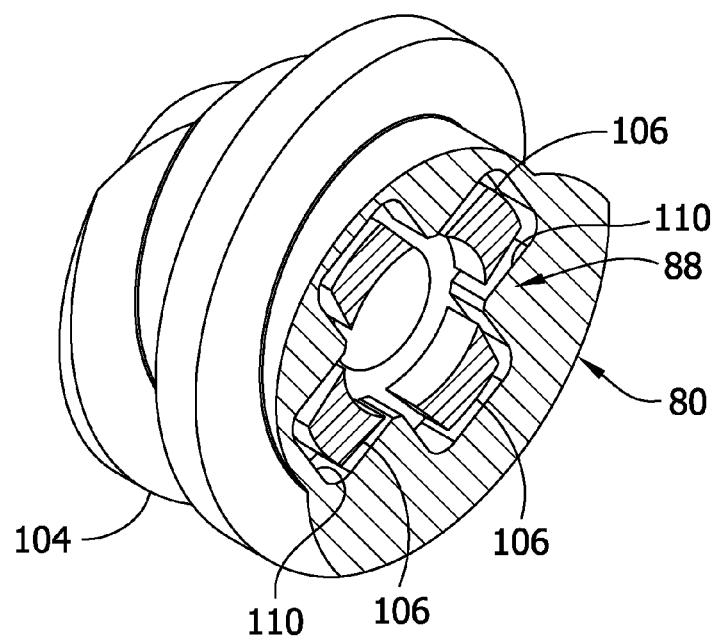
FIG. 9 is a perspective in section taken in the plane of 9-9 of FIG. 8.

The second hub member 74 is generally cylindrical having the ratchet teeth 74T formed on one end in an annular configuration. As illustrated, the second hub member 74 is sized to fit inside a recess in the first hub member 72 in a position in which the ratchet teeth 72T, 74T engage one another as shown in FIG. 7. The ratchet teeth on the first and second hub members 72, 74 have a saw-tooth configuration, e.g., a 45 degree saw-tooth configuration. The teeth 72T, 74T may gave other configurations without departing from the scope of the present invention. The number of teeth 72T, 74T on the hub members 72, 74 may vary depending on the desired frequency of adjustment provided by the self-adjusting mechanism 22. More specifically, the number of teeth on the hub members is inversely proportional to the extent of axial wear of the friction members 32 required to trigger an adjustment cycle of operation. Increasing the number of teeth will trigger an adjustment cycle in response to a smaller amount of axial wear, and decreasing the number of teeth will trigger an adjustment cycle in response to a larger amount of axial wear. In the illustrated mechanism 22, the hub members 72, 74 have 48 teeth.

The worm gear 80 is also mounted on the shaft 62 for rotation about the axis of rotation 76. The worm gear 80 comprises a helical tooth 104 configured for engagement with the adjustment ring 40 such that rotation of the worm gear in the second rotational direction RD2 advances (rotates) the adjustment ring in the second axial direction AD2 toward the pressure plate 30 to compensate for axial wear of the frictional surfaces of the clutch.

Figure 10A:
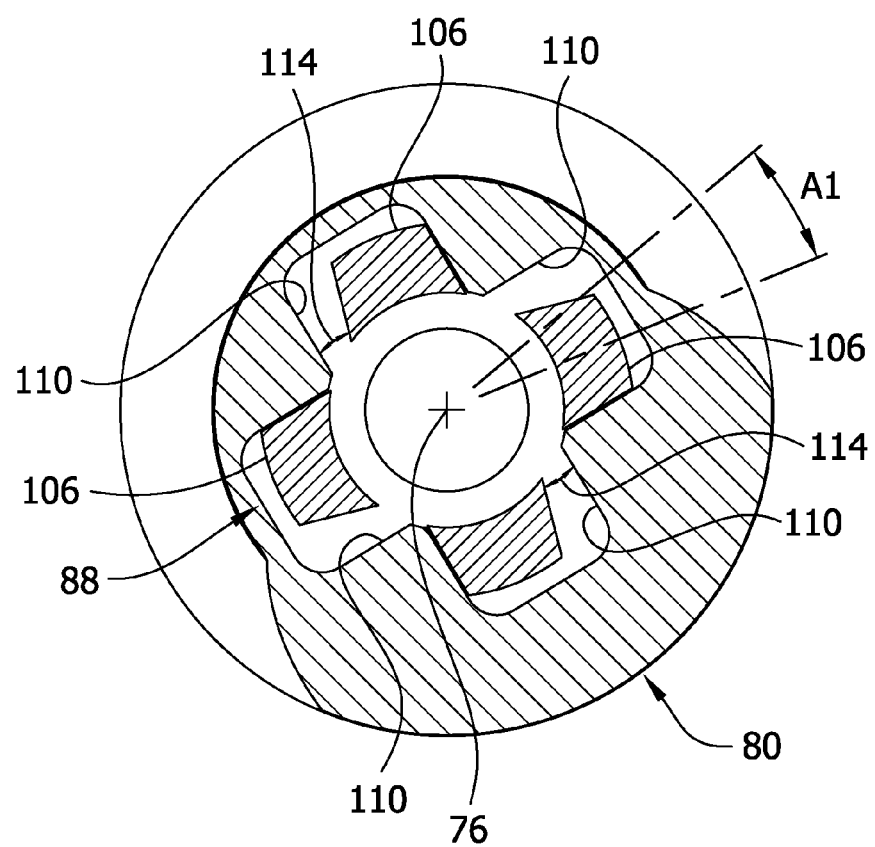
FIGS. 10A and 10B are elevations in section of the lost-motion connection of FIG. 9 showing rotation of the second hub member relative to the worm gear.
Figure 10B:
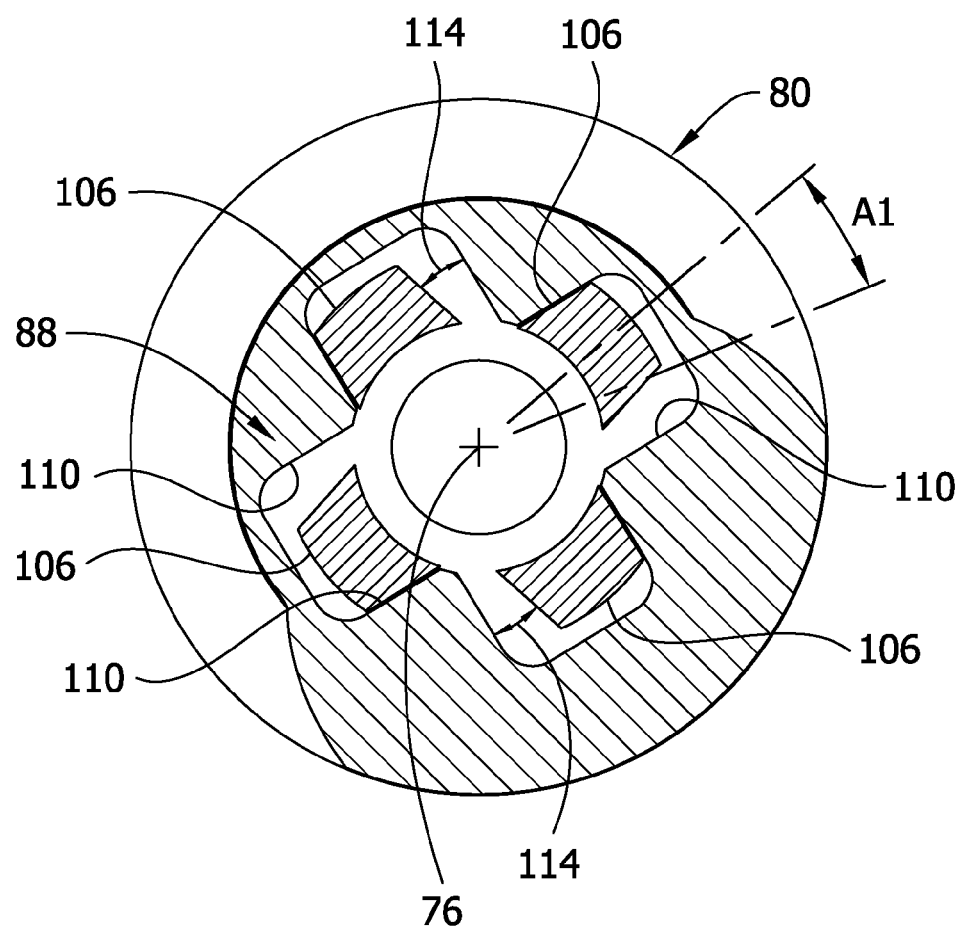

The lost-motion connection 88 between the second hub member 74 and the worm gear 80 comprises a first set of spaced-apart lugs 106 on an end surface 108 of the second hub member 74 facing the worm gear, and a second set of spaced-apart lugs 110 on an end surface 112 of the worm gear facing (opposing) the second hub member 74. The two sets of lugs 106, 110 are angularly spaced around the respective end surfaces 108, 112 forming gaps for receiving the lugs. Thus, the lugs 106, 110 loosely mesh or interdigitate with one another such that there is limited range of free rotational movement or free play of the second hub member 74 as it rotates in the stated first and second rotational directions RD1, RD2 relative to the worm gear 80. This range of free-play rotational movement is indicated at 114 in FIGS. 10A and 10B, which illustrate the lugs 106 on the second hub member 74 moving freely in the spaces 116 between the lugs 110 on the worm gear 80 as the second hub member rotates through an angle of rotation A1 without moving the worm gear 80. By way of example but not limitation, this limited range of free-play movement (i.e., angle of rotation A1) may approximate about 23 to about 35 degrees, e.g., about 24 degrees, of angular rotation of the second hub member 74. As illustrated, the lugs 110 on the worm gear 80 are recessed in an opening 118 sized for receiving the lugs 106 on the second hub member 74. The opening 118 also receives an portion of the second hub member 74 from which the lugs 106 extend to enclose the lost-motion connection 88 to protect it from debris that would otherwise build up on the connection, fouling the connection and potentially accelerating wear. Thus, the opening 118 forms a housing sized for receiving the lost motion mechanism to protect the mechanism from contaminates.

Referring to FIG. 4, the anti-slip device 82 comprises a wire spring having a loop portion or coil 120 encircling and gripping a cylindrical boss 122 at one end of the worm gear 80, and an arm portion 124 extending from the loop portion through an opening 126 in the leg 92 of the adjacent mounting bracket 60. The anti-slip device 82 is configured to hold the worm gear 80 against rotation in the first rotational direction RD1 but to allow rotation of the worm gear in the second rotational direction RD2.

As illustrated in FIG. 4, the self-adjusting mechanism 22 further comprises a spring device 130 positioned in a recess 132 in the first hub member 72 for biasing the ratchet teeth 72T, 74T of the hub members 72, 74 into meshing engagement with one another. Together the ratchet teeth 72T, 74T and spring device 130 form a ratchet mechanism between the first and second hub members 72, 74. A flange or collar 134 on the shaft 102 is sized for entering the recess 132 in the first hub member 72 to capture the spring device 130 in the first hub member 72 and to provide a surface upon which the spring device reacts. In the illustrated embodiment, the spring device 130 comprises one or more annular wave springs or washers seated on the shaft 62, but the spring device may have other configurations (e.g., one or more disc springs). The recess 132 in the first hub 72 in combination with the collar 134 on the shaft 102 protects the spring device 130 from debris that would otherwise build up on the spring, causing wear and potential failure. Further, forming the collar 134 on the shaft 102 eliminates the need for a separate spring cover, reduces required inventor and assembly time.

Each end of the shaft 62 has a threaded opening 140 for receiving a screw fastener 142 to hold the shaft in position in the corresponding opening 92 in the leg 90 of the bracket 60. The shaft 62 may have a pair of opposite facing shoulders as shown so each shoulder abuts one of said brackets 60. In addition, the opening 92 in each bracket 60 and the corresponding portions of the shaft 62 may have flats as shown in FIG. 4 to prevent the shaft from turning in the brackets. The screw fasteners hold the shaft in position between the brackets and allow the mechanism 22 to be preassembled separate from the clutch cover 26.

As illustrated in FIGS. 1 and 2, a connector, generally designated by 150, that connects the self-adjusting mechanism 22 to the release mechanism 36 has an opening 152 for snugly receiving the adjustment arm 78. An end of the connector 150 opposite the opening 152 engages an opening 154 in the release sleeve 44 of the release mechanism 36. The connection between the adjustment arm 78 and clutch release mechanism 36 may have other configurations, so long as movement of the release mechanism in both directions results in a corresponding movement of the adjustment arm, with little or no lost-motion between the adjustment arm and release mechanism.

The self-adjusting mechanism 22 will now be described as it moves through a "normal" (non-adjustment) cycle of operation during which there is no adjustment of the relative positions of the friction members 32 due to wear, and through an adjustment cycle of operation during which there is an axial adjustment of the positions of the friction members to compensate for friction wear.

Assuming the friction surfaces of the friction members 32 of the clutch have not worn to an amount requiring adjustment, a normal (non-adjustment) cycle of clutch operation is as follows.

Figure 11:
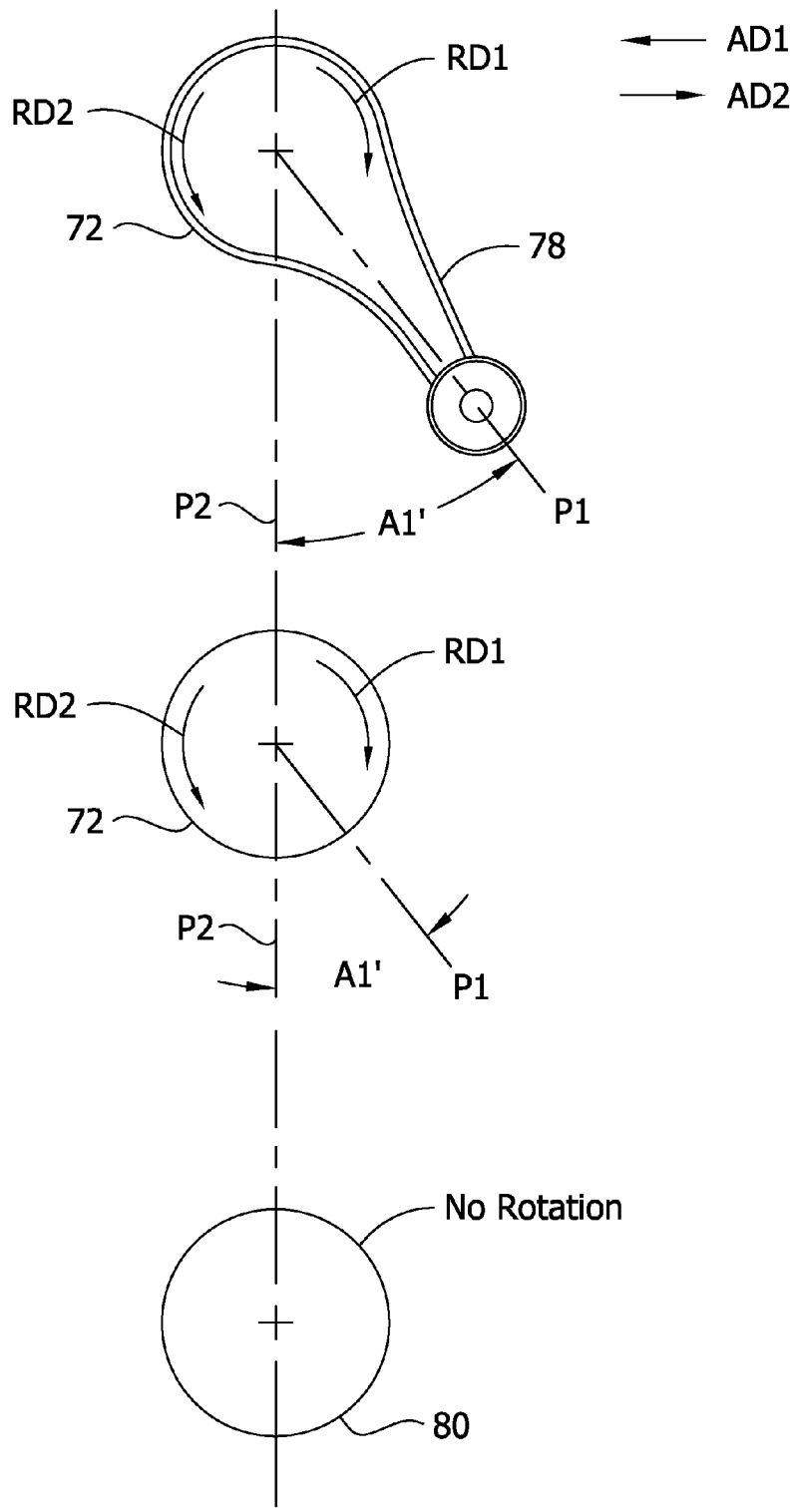
FIG. 11 is a schematic showing relative rotation between the first hub member, the second hub member, and the worm gear during a normal (non-adjustment) cycle of clutch operation.

When the clutch pedal is depressed to disengage the clutch, as illustrated in FIG. 3, the release mechanism 36 (release sleeve 44 and levers 48 engaging pressure plate 30) moves through a normal clutch-disengage stroke a first axial distance D1 in the stated first axial direction (toward the left as viewed in FIGS. 2 and 3) away from the pressure plate 30 of the clutch to disengage the friction surfaces of the friction members 32 of the clutch. The adjustment arm 78 is connected via the connector 150 to the release mechanism 36, such that movement of the release mechanism in the first axial direction AD1 causes the adjustment arm and first hub member 72 to rotate in the stated first rotational direction through a non-adjustment angle of rotation A1' from angular position P1 to angular position P2 (see FIG. 11). The spring device 130 exerts an axial force urging the ratchet teeth 72T of the first hub member 72 into engagement with ratchet teeth 74T on the second hub member 74 such that rotation of the first hub member through the angle of rotation A1' drives the second hub member in the same first rotational direction RD1 through the same angle of rotation A1' to angular position P2 (FIG. 11). Desirably, the non-adjustment angle of rotation A1' is equal to or slightly less than (e.g., within about one to about five degrees) the stated free-play angle A1 permitted by the lost-motion connection 88 between the second hub member 74 and the worm gear 80. As a result, rotation of the second hub member 74 in the first rotational direction RD1 through the angle of rotation A1' does not cause rotation of the worm gear (see FIG. 11). In other words, the amount of free-play 114 in the lost-motion connection 88 (FIGS. 10A and 10B) is sufficient to accommodate rotational movement of the second hub member 74 through the angle of rotation A1' without rotating the worm gear 80. The anti-slip device 82 on the end of the worm gear 80 applies a constant anti-rotational force, inhibiting rotation of the worm gear in both directions. During a "normal" cycle of clutch operation, this force prevents the worm gear 80 from turning.

When the clutch pedal is released to engage the clutch, the release mechanism 36 is moved by the coil clutch springs 56 through a clutch-engage stroke (toward the right as viewed in FIG. 3) the same axial distance D1 in the second axial direction AD2 toward the pressure plate 30 of the clutch to engage the friction surfaces of the friction members 32 of the clutch. Through the connection 150, the movement of the release mechanism 36 rotates the adjustment arm 78 in the second rotational direction RD2 (toward the pressure plate 30) back through the same non-adjustment angle of rotation A1' from angular position P2 to angular position P1 (see FIG. 11). The ratchet teeth 72T of the first hub member 72 remain fully engaged with the ratchet teeth 74T of the second hub member 74 such that rotation of the first hub member back through angle A1' drives the second hub member 74 in the same second rotational direction RD2 back through the same angle of rotation A1. The lost-motion connection 88 between the worm gear 80 and the second hub member 74 is such that rotation of the second hub member 74 in the second rotational direction RD2 back through the angle of A1' does not rotate the worm gear 80. At the end of this "normal" cycle of operation, the worm gear has not rotated. As a result, the adjustment ring on the clutch has not been moved.

Assuming the friction surfaces of the friction members 32 of the clutch have worn to an extent requiring axial adjustment of the clutch release mechanism 36 to compensate for the wear, an "adjustment" cycle of clutch operation is as follows.

Figure 12:
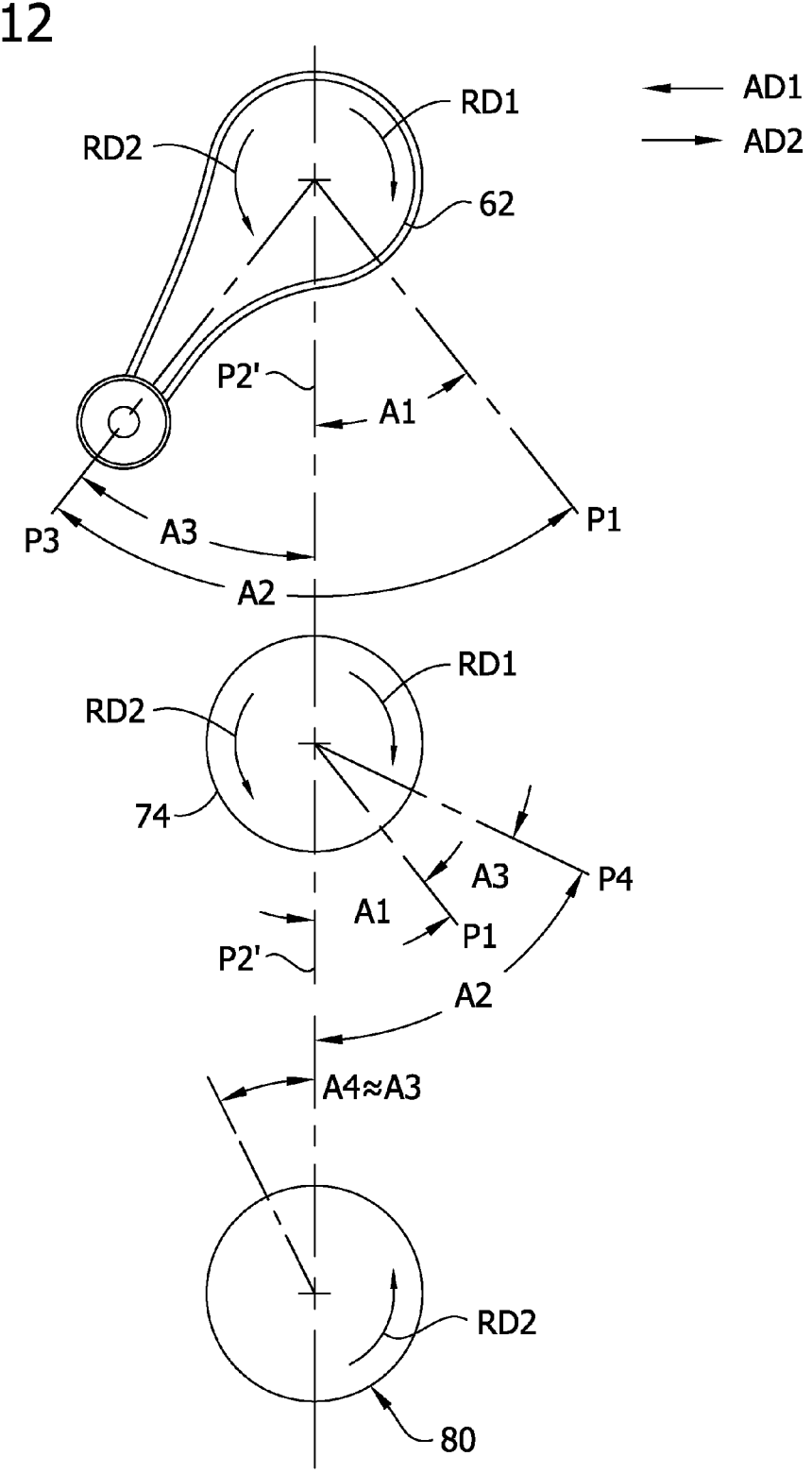
FIG. 12 is a schematic showing relative rotation between the first hub member, the second hub member, and the worm gear during an adjustment cycle of clutch operation.

When the clutch pedal is depressed to disengage the clutch, the clutch release mechanism 36 (release sleeve 44 and levers 48 engaging the pressure plate 30) moves in the first axial direction AD1 through a clutch-disengage stroke a second axial distance D2 away from the pressure plate 30 of the clutch to disengage the friction surfaces of the friction members 32 of the clutch. Due to wear of the friction surfaces, the distance D2 is greater than distance D1 by some delta distance D3 (see FIGS. 2 and 3). Because of this delta distance D3, the adjustment arm 78 and first hub member 72 are driven via the connection 150 in the first rotational direction RD1 through an adjustment angle of rotation A2 (see FIG. 12) from position P1 to position P3. The adjustment angle of rotation A2 is greater than the non-adjustment angle A1 by a delta angle of rotation A3 (see FIG. 11). As the first hub member 72 rotates in the first rotational direction RD1 through the angle of rotation A2, the second hub member 74 rotates only through angle A1 from position P1 to position P2' until the free-play in the lost most connection 88 between the second hub member 74 and the worm gear 80 is taken up, at which time the anti-slip device 82 prevents further rotation of the second hub member 74 and the worm gear, even as the first hub member 72 continues to rotate through the delta angle of rotation A3. The anti-rotational force exerted by the anti-slip device 82 is sufficient to cause the teeth 72T on the first hub member 72 to separate from the teeth 74T on the second hub member 74 against the urging of the spring device 130, allowing the first hub member 72 to rotate in the first rotational direction RD1 relative to the second hub member 74 through the delta angular interval A3, which is equal to at least one tooth interval. When the first hub member 72 has completed its movement through angular interval A3, the teeth 72T, 74T move back into engagement under the urging of the spring device 130.

Thus, as will be appreciated by those skilled in the art, second hub member 74 is operatively connected to the adjustment ring 40 such that rotating the second hub member about the longitudinal axis 76 of the shaft 60 through angles in a first rotational direction RD1 greater than a predetermined angle moves the adjustment ring with respect to the cover to adjust relative positions of the clutch release mechanism and the cover to compensate for wear between the friction members. The adjustment ring 40 remains stationary as the second hub member 74 rotates about the longitudinal axis 76 of the shaft 60 through angles less than the predetermined angle in the first rotational direction RD1 and through angles less than the predetermined angle in the second rotational direction RD2.

The teeth 72T, 74T on the first hub member 72 and second hub member 74 have a saw-tooth configuration such that a rotational force exerted on the first hub member in the first rotational direction generates a frictional force between the teeth that includes a rotational component perpendicular to axis 28 and an axial component parallel to axis 28. The teeth are able to separate when the axial component is sufficient to overcome the axial force exerted by the spring device 130 in the opposite direction. The engaging teeth 72T, 74T are ratchet teeth, so that the teeth cannot separate when the first hub member 72 is rotated in the second rotational direction during the clutch-engage stroke, described below.

When the clutch pedal is released to engage the clutch, the release mechanism 36 is moved in the second axial direction AD2 through a clutch-engage stroke the same axial distance D2 toward the pressure plate 30 of the clutch (toward the right in FIG. 3) to engage the friction surfaces of the friction members 32 of the clutch. Through the connection 150, the movement of the release mechanism 36 rotates the adjustment arm 78 and first hub member 72 in the second rotational direction RD2 back through the same adjustment angle of rotation A2 from position P3 to position P1. The ratchet teeth 72T of the first hub member 72 remain engaged with the ratchet teeth 74T on the second hub member 74 such that rotation of the first hub member back through adjustment angle of rotation A2 drives the second hub member 74 in the same second rotational direction RD2 back through the same angle of rotation A2 from angular position P2' to angular position P4 (see FIG. 12). The lost-motion connection 88 between the worm gear 80 and the second hub member 74 is such that rotation of the second hub member 74 in the second rotational direction RD2 back through the adjustment angle of rotation A2 effects an incremental rotation of the worm gear in the second rotational direction RD2, as permitted by slippage of the anti-slip device 82, through an angle of rotation A4 approximating the delta angle of rotation A3 (see FIG. 12), which is typically an angle equal to one tooth interval. This incremental rotation of the worm gear 80 through the angle of rotation A4 rotates the adjustment ring 40 to compensate for the wear of the friction surfaces of the friction members 32 of the clutch.

After completion of an adjustment cycle, normal cycles of operation continue, each accompanied by a "normal" operation stroke length substantial equal to distance D2, until such time as the friction surfaces wear to an extent allowing the ratchet teeth 72T, 74T to separate and the first hub member 72 to rotate an additional tooth relative to the second hub member 74.

By way of example but not limitation, the angles of rotation A1, A2, A3, and A4 may have the following values: A1=about 23 to about 35 degrees, e.g., about 30 degrees; A2=about 33 to about 42 degrees, e.g., about 38 degrees; A3=about 5 to about 10 degrees, e.g., about 7.5 degrees, for a hub member 72, 74 having 48 teeth; and A4=about 5 to about 10 degrees, e.g., about 7.5 degrees, for a hub member 72, 74 having 48 teeth (A3 and A4 will vary depending on the number of teeth on the hub members 72, 74). In one embodiment, the limited range of free-play rotational movement allowed by the lost-motion connection 88 approximates the angle of rotation A1.

In the self-adjusting mechanism 22 described above, the lost-motion connection 88 is located between the worm gear 80 and the second hub member 74. In a second embodiment of the self-adjusting mechanism (not shown), the worm gear and second hub member are connected for unitary rotation, that is, there is no lost rotational motion or free play between the worm gear and the second hub member. Instead, the lost-motion connection is located between the adjustment arm 78 and the release mechanism 36. By way of example, the lost-motion connection may comprise a loose fit of the adjustment arm 78 in the opening 152 in the connector 150 to allow a limited range of free play between these components before axial movement of the release mechanism causes rotational movement of the adjustment arm. The lost-motion connection is such that, during a non-adjustment cycle, the movement of the release mechanism 36 is within the range of free play between the adjustment arm 78 and the connector 150 so that the worm gear 80 is not rotated. However, during an adjustment cycle, the release mechanism moves a distance which is more than sufficient to take up the free play between the release mechanism and the adjustment arm and sufficient to cause rotation of the first hub member relative to the second hub member in the stated first rotational direction, as in the first embodiment. As a result, the worm gear 80 is caused to rotate to axially adjust the friction members 32. In all other respects, operation and construction of the second embodiment of the self-adjusting mechanism is the same as the first embodiment 22.

Having described the device in detail, it will be apparent that modifications and variations are possible without departing from the scope of the invention defined in the appended claims.

When introducing elements of the present invention or the preferred embodiments(s) thereof, the articles "a", "an", "the", and "the" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting.

What is claimed is:

1. A self-adjusting mechanism for a friction clutch having a cover, a pressure plate movable relative to the cover to selectively engage opposing friction members with one another, a clutch release mechanism movable relative to the cover to disengage the opposing friction members, and an adjustment ring selectively moveable with respect to the cover to adjust a position of the clutch release mechanism relative to the cover to compensate for wear between the opposing friction members, the self-adjusting mechanism comprising:

a unitary shaft mounted on the cover, the shaft having a central longitudinal axis and a flange extending radially outward from and circumferentially around the shaft;

a first hub member rotatably mounted on the shaft and operatively connected to the clutch release mechanism such that moving the clutch release mechanism in a first direction rotates the first hub member about the longitudinal axis of the shaft in a first rotational direction and moving the clutch release mechanism in a second direction opposite the first direction rotates the first hub member about the longitudinal axis of the shaft in a second rotational direction opposite the first rotational direction;

a second hub member rotatably mounted on the shaft coaxially with the first hub member and operatively connected to the adjustment ring such that rotating the second hub member about the longitudinal axis of the shaft through angles in a first rotational direction greater than a predetermined angle moves the adjustment ring with respect to the cover to adjust relative positions of the clutch release mechanism and the cover to compensate for wear between the friction members, the adjustment ring remaining stationary as the second hub member rotates about the longitudinal axis of the shaft through angles less than the predetermined angle in the first rotational direction and through angles less than the predetermined angle in the second rotational direction opposite the first rotational direction;

a spring biasing one of the first hub member and the second hub member toward the other; and a spring housing having an interior formed in the one of the first hub member and the second hub member and an opening providing access to the interior, the housing being sized and shaped for receiving the spring, the opening of the spring housing being blocked by the flange of the shaft to prevent contaminates from entering the housing thereby protecting the spring from contaminates.

2. A self-adjusting mechanism as set forth in claim 1, further comprising a ratchet mechanism operatively connecting the first hub member and the second hub member, the ratchet mechanism causing the first hub mechanism and the second hub mechanism to rotate in unison about the longitudinal axis of the shaft as the second hub member rotates through angles less than the predetermined angle in the first rotational direction and in the second rotational direction.

3. A self-adjusting mechanism as set forth in claim 2, wherein:

the first hub member has a set of teeth;

the second hub member has a set of teeth adapted to mesh with the teeth of the first hub member, wherein the spring biases the first hub member against the second hub member so the second hub member rotates in unison with the first hub member unless the second member is held stationary against rotation; and the ratchet mechanism comprises the spring, the set of teeth of the first hub member and the set of teeth of the second hub member.

4. A self-adjusting mechanism as set forth in claim 1, wherein the ratchet mechanism holds the second hub member and the adjustment ring to remain stationary as the first hub member rotates about the longitudinal axis of the shaft through angles greater than the predetermined angle in the second rotational direction.

5. A self-adjusting mechanism as set forth in claim 4, further comprising a drive rotatably mounted on the shaft coaxially with the first and second hub members and operatively connecting the second hub member to the adjustment ring so the adjustment ring moves with respect to the cover as the second hub member rotates the drive.

6. A self-adjusting mechanism as set forth in claim 5, wherein the drive comprises a worm gear.

7. A self-adjusting mechanism as set forth in claim 5, further comprising an anti-slip device operatively connecting the drive and the cover such that the drive is free to rotate in the first rotational direction and the drive is held stationary against rotation in the second rotational direction.

8. A self-adjusting mechanism as set forth in claim 7, wherein the anti-slip device comprises a coil wrapping around the drive and having one end held fixed with respect to the cover, the coil being wrapped so the coil tightens around the drive to prevent the drive from rotating in the second rotational direction and loosens around the drive to permit the drive to rotate in the first rotational direction.

9. A self-adjusting mechanism as set forth in claim 1, wherein the spring housing interior is formed in the first hub member.

10. A self-adjusting mechanism as set forth in claim 9, wherein the spring comprises a series of wave washers.

11. A self-adjusting mechanism as set forth in claim 10, wherein:

the series of wave washers is completely inside the spring housing interior; and the flange of the shaft is received in the opening of the spring housing interior.

12. A self-adjusting mechanism as set forth in claim 11, wherein the first hub member moves axially along the shaft toward the shaft flange when the spring compresses.

13. A self-adjusting mechanism for a friction clutch having a cover, a pressure plate movable relative to the cover to engage opposing friction members with one another, a clutch release mechanism movable relative to the cover to disengage the pair of friction members, and an adjustment ring selectively moveable with respect to the cover to adjust relative positions of the clutch release mechanism and the cover to compensate for wear between the friction members, the self-adjusting mechanism comprising:

a shaft mounted on the cover, the shaft having a central longitudinal axis and a flange;

a hub member rotatably mounted on the shaft and operatively connected to the clutch release mechanism such that moving the clutch release mechanism in a first direction tends to rotate the hub member about the longitudinal axis of the shaft in a first rotational direction and moving the clutch release mechanism in a second direction opposite the first direction tends to rotate the hub member about the longitudinal axis of the shaft in a second rotational direction opposite the first rotational direction;

a drive rotatably mounted on the shaft coaxially with the hub member and operatively connected to the adjustment ring so the adjustment ring moves with respect to the cover as the drive rotates about the longitudinal axis of the shaft;

a lost motion mechanism operatively connected between the hub member and drive allowing the hub member and the drive to rotate freely with respect to one another over a limited angular range; and a mechanism housing formed in at least one of the hub member and the drive, the housing being sized for receiving the lost motion mechanism to protect the mechanism from contaminates.

14. A self-adjusting mechanism as set forth in claim 13, wherein the lost motion mechanism comprises:

a plurality of lugs extending from the hub member toward the drive, each lug of the plurality of lugs of the hub member being spaced from adjacent lugs of the plurality of lugs of the hub member by a gap; and a plurality of lugs extending from the drive toward the hub member, each lug of the plurality of lugs of the drive being spaced from adjacent lugs of the plurality of lugs of the drive by a gap;

wherein each lug of the plurality of lugs of the hub member is received in a corresponding gap spacing lugs of the plurality of lugs of the drive, and each lug of the plurality of lugs of the drive is received in a corresponding gap spacing lugs of the plurality of lugs of the hub member so the lugs of the plurality of lugs of the hub member are interdigitated with the plurality of lugs of the drive.

15. A self-adjusting mechanism as set forth in claim 14, wherein:
each lug of the plurality of lugs of the hub member has a width narrower than each corresponding gap spacing lugs of the plurality of lugs of drive; and
each lug of the plurality of lugs of the drive has a width narrower than each corresponding gap spacing lugs of the plurality of lugs of the hub member such that the drive remains stationary as the hub member rotates about the longitudinal axis of the shaft through angles less than a predetermined angle and the drive tends to rotate about the longitudinal axis of the shaft as the hub member rotates about the longitudinal axis of the shaft through angles greater than the predetermined angle.

16. A self-adjusting mechanism as set forth in claim 15, wherein the predetermined angle is in a range from about 23 degrees to about 35 degrees.

17. A self-adjusting mechanism as set forth in claim 16, wherein the predetermined angle is about 24 degrees.

18. A self-adjusting mechanism as set forth in claim 14, wherein the mechanism housing has an interior cavity formed in the drive, the cavity being sized and shaped for receiving at least a portion of the hub member having the plurality of lugs to protect the lost motion mechanism from contaminates.

19. A self-adjusting mechanism as set forth in claim 18, wherein:
the mechanism housing has an opening providing access to the interior cavity; and
the hub member fills the opening to block contaminates from entering the housing.

20. A self-adjusting mechanism for a friction clutch having a cover, a pressure plate movable relative to the cover to engage opposing friction members with one another, a clutch release mechanism movable relative to the cover to disengage the pair of friction members, and an adjustment ring selectively moveable with respect to the cover to adjust relative positions of the clutch release mechanism and the cover to compensate for wear between the friction members, the self-adjusting mechanism comprising:
a first mount mounted on the cover and having an opening extending through a thickness;
a second mount mounted on the cover opposing the first mount, the second mount being identical to the first mount and spaced from the first mount by a predetermined distance;
a shaft mounted between the first and second mounts, the shaft having a central longitudinal axis extending between opposite ends and a pair of opposite facing shoulders spaced from one another by the predetermined distance, one of the shoulders abutting the first mount so the shaft extends into the opening thereof, and the other of the shoulders abutting the second mount so the shaft extends into the opening thereof;
a first hub member rotatably mounted on the shaft between the first and second mounts and operatively connected to the clutch release mechanism such that moving the clutch release mechanism in a first direction rotates the first hub member about the longitudinal axis of the shaft in a first rotational direction and moving the clutch release mechanism in a second direction opposite the first direction rotates the first hub member about the longitudinal axis of the shaft in a second rotational direction opposite the first rotational direction;
a second hub member rotatably mounted on the shaft between the first and second mounts coaxially with the first hub member and operatively connected to the adjustment ring such that rotating the second hub member about the longitudinal axis of the shaft through angles in a first rotational direction greater than a predetermined angle moves the adjustment ring with respect to the cover to adjust relative positions of the clutch release mechanism and the cover to compensate for wear between the friction members, the adjustment ring remaining stationary as the second hub member rotates about the longitudinal axis of the shaft through angles less than the predetermined angle in the first rotational direction and through angles less than the predetermined angle in the second rotational direction opposite the first rotational direction; and
a spring biasing one of the first hub member and the second hub member toward the other, the spring being positioned between the one of the first hub member and the second hub member and a corresponding one of the first mount and the second mount.

21. A self-adjusting mechanism as set forth in claim 20, further comprising a pair of fasteners, each of the pair of fasteners being fastened to one of the opposite ends of the shaft, each of the pair of fasteners having a head positioned on a face of the corresponding mount opposite that abutted by the corresponding shaft shoulder.

22. A self-adjusting mechanism as set forth in claim 20, wherein:
at least one of the first and second hub members having an engagement formation for engaging the other of the first and second hub members, the first and second hub members rotating in unison when the engagement formation engages the other of the first and second hub members, and the first and second hub members being free to rotate independently when the engagement formation disengages the other of the first and second hub members; and
the spring biases the engagement formation of the at least one of the first and second hub members into engagement with the other of the first and second hub members.

23. A self-adjusting mechanism as set forth in claim 22, wherein:
the first hub member has a set of teeth;
the second hub member has a set of teeth adapted to mesh with the teeth of the first hub member; and
the engagement formation comprises the set of teeth of the first hub member and the set of teeth of the second hub member.

24. A self-adjusting mechanism as set forth in claim 20, further comprising a drive rotatably mounted on the shaft coaxially with the first and second hub members and operatively connecting the second hub member to the adjustment ring so the adjustment ring moves with respect to the cover as the second hub member rotates the drive.

25. A self-adjusting mechanism as set forth in claim 24, further comprising a coil wrapping around the drive and having one end held fixed with respect to the cover, the coil being wrapped so the coil loosens around the drive to permit the drive to rotate in a first rotational direction and tightens around the drive to prevent the drive from rotating in a second rotational direction opposite the first rotational direction.

26. A self-adjusting mechanism as set forth in claim 20, further comprising a spring housing having an interior formed in the first hub member and an opening providing access to the interior, the housing being sized and shaped for receiving the spring, the opening of the spring housing being blocked to prevent contaminates from entering the housing thereby protecting the spring from contaminates.

* * * * *